Aug. 11, 1936.  M. M. DEAN  2,050,425
REFRIGERATING VEHICLE BODY
Filed Nov. 11, 1935  4 Sheets-Sheet 3
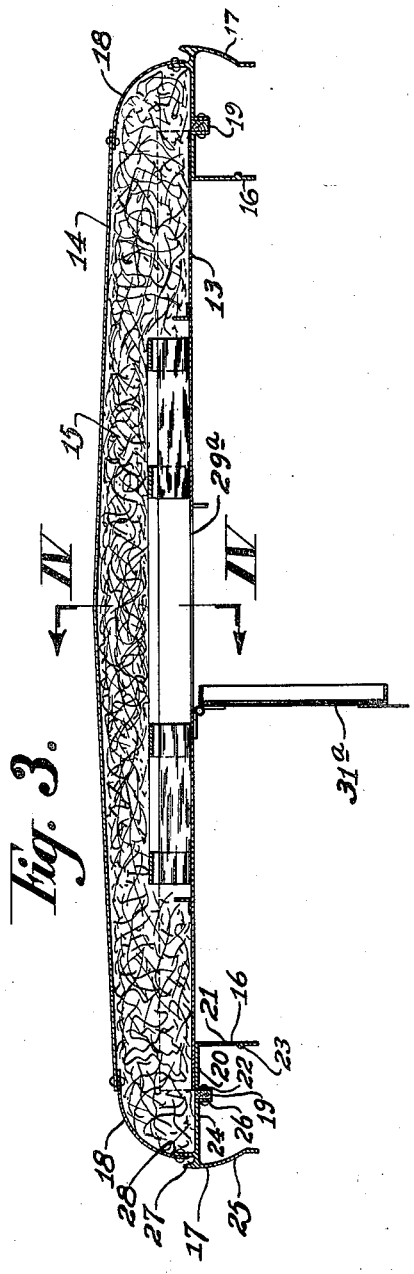
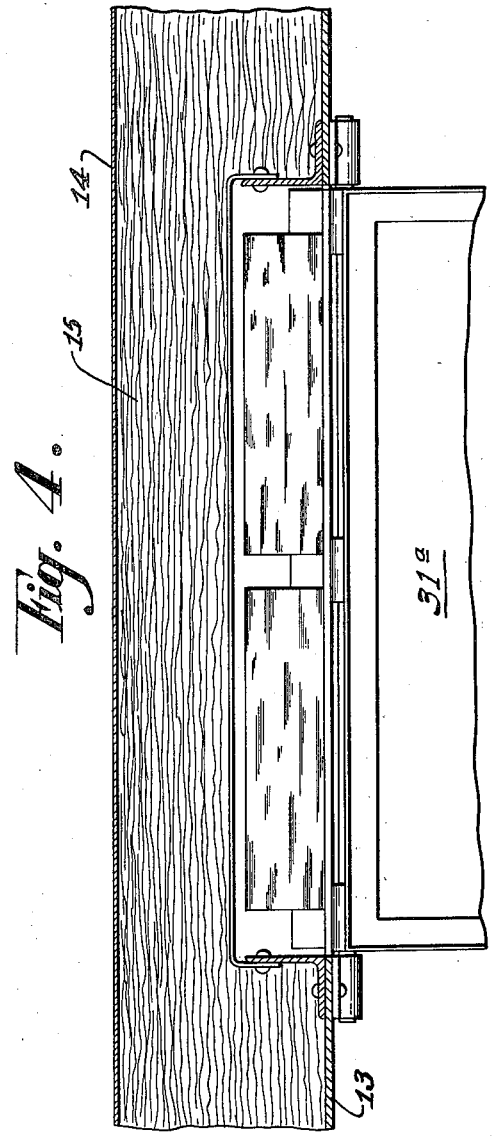
INVENTOR
MILO M. DEAN.
BY
his ATTORNEY

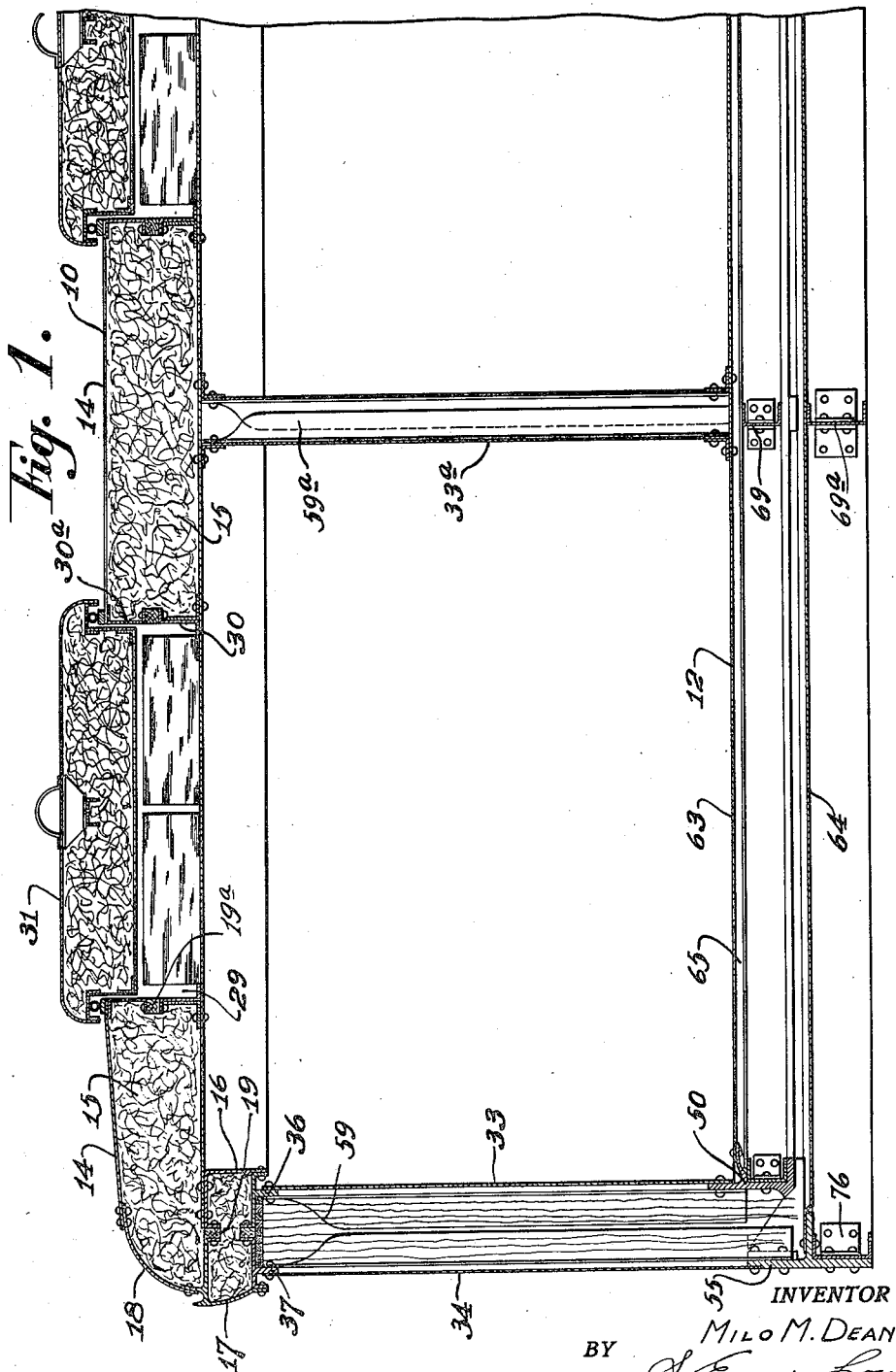

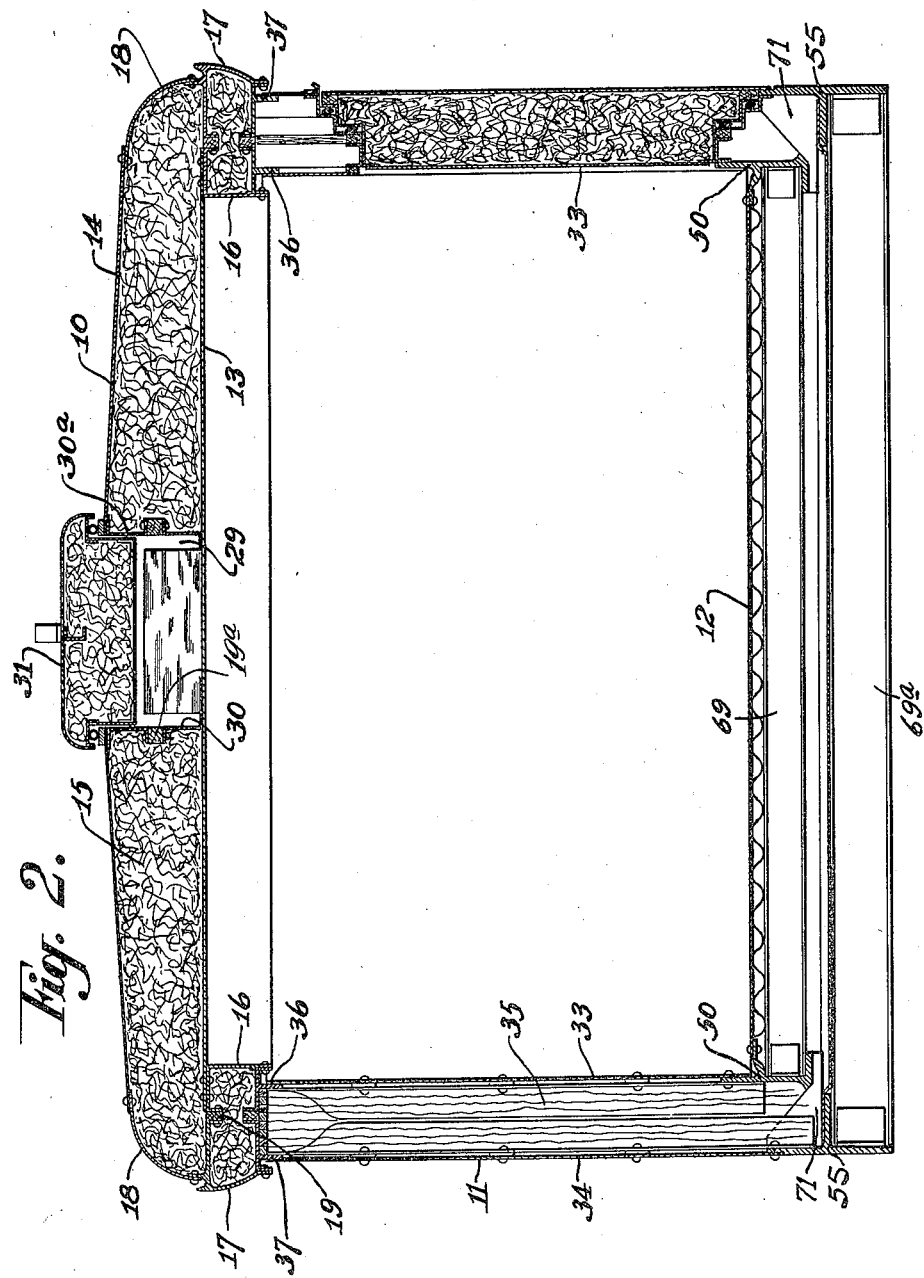

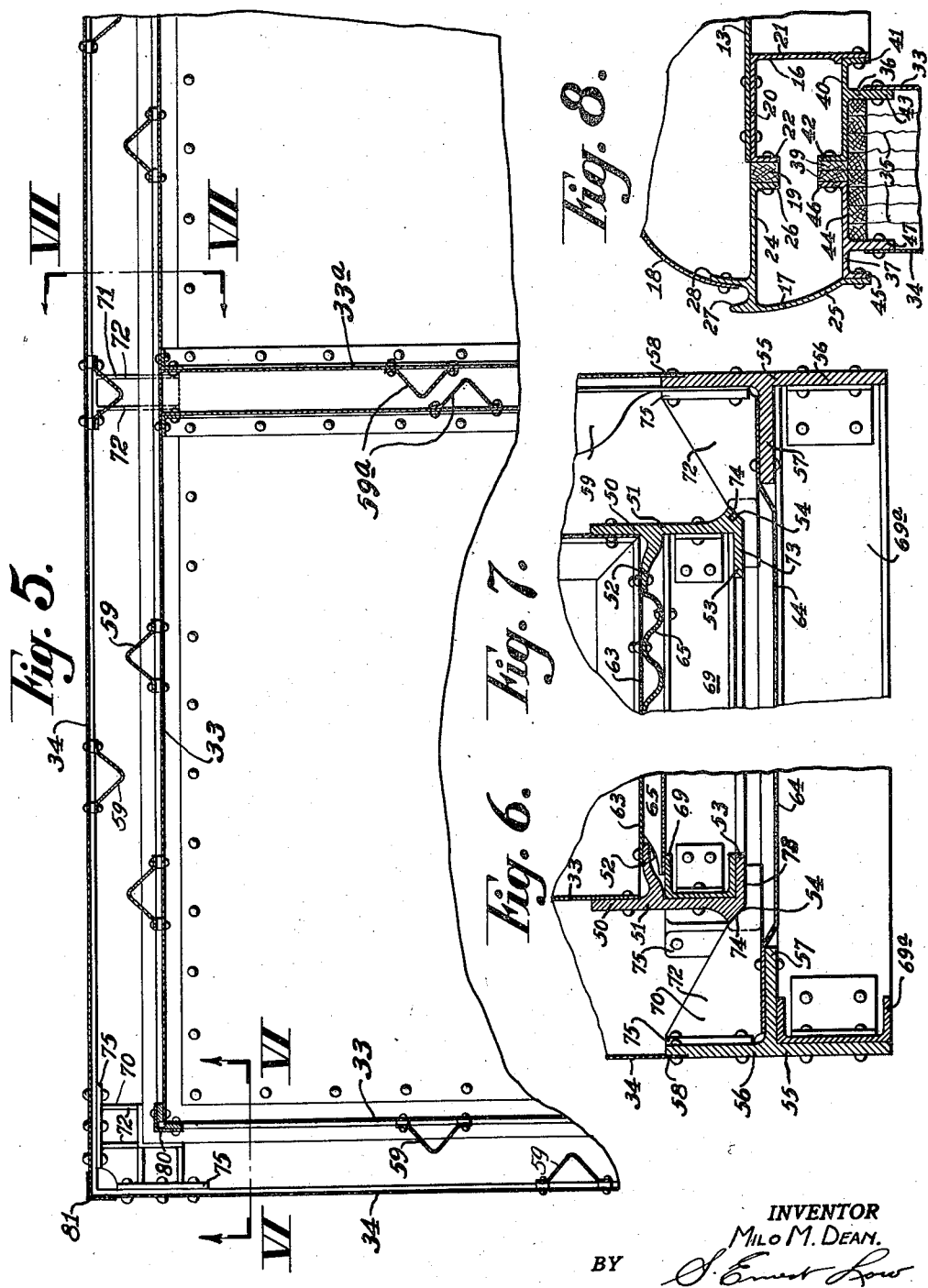

Patented Aug. 11, 1936

2,050,425

UNITED STATES PATENT OFFICE 2,050,425

REFRIGERATING VEHICLE BODY

Milo M. Dean, New Kensington, Pa., assignor to Aluminum Company of America, Pittsburgh, Pa., a corporation of Pennsylvania Application November 11, 1935, Serial No. 49,245

9 Claims. (Cl. 296—24)

This invention relates to vehicle bodies provided with refrigerating means for transporting foods or the like, and more particularly it relates to automobile truck bodies provided with such refrigerating means.

Refrigerating vehicles designed to be fabricated in sections and then assembled are known but have the disadvantage of lacking flexibility in production and in use. It is a requisite of quantity or straight line production where the vehicle body sections are fabricated and then assembled that parts be standardized, which has always resulted in difficulty in meeting varied requirements, and this is particularly true of refrigerating vehicle bodies because of the insulating walls required. In use, the lack of flexibility lies in the fact that with a single ice container for the whole load space, less-than-full loads require as much ice as full loads. An effort has been made to meet this difficulty by dividing the load space into a plurality of compartments, separately iced. This expedient has been only partially successful because in order to avoid taking up too much of the load space with ice containers it has been necessary to place the ice containers in the roof of the body, with the result that the roof must be made strong enough to support the weight of a workman when the containers are to be charged, with consequent increase in dead weight. Another disadvantage of known compartment bodies for refrigerating vehicles made by assembling prefabricated parts is that these bodies deteriorate rapidly because of the number of joints.

Accordingly, it is an object of the present invention to provide a vehicle body of the refrigerator type made up of prefabricated sections assembled in straight line production according to required measurements. Another object is to provide a vehicle body with provision for icing portions of the load space so that less-than-full loads may be hauled economically and without increasing the dead weight. Another object is to provide a refrigerating vehicle body the parts of which may be quickly and easily assembled into a strong, durable construction of light weight. Other objects and advantages will appear as the description proceeds.

In the accompanying drawings, in which like reference numerals indicate like parts throughout the several figures, I have shown certain forms and modifications of my invention as applied to an automobile truck refrigerator body designed particularly for hauling ice cream.

Fig. 1 is a vertical sectional view taken longitudinally of a portion of the vehicle body embodying one form of my invention;

Fig. 2 is a vertical sectional view taken transversely of the same body;

Fig. 3 is a vertical sectional view taken transversely of the roof of a vehicle body and showing my new arrangement of ice containers;

Fig. 4 is an enlarged vertical sectional view taken on the line IV—IV of Fig. 3;

Fig. 5 is a horizontal sectional view of a portion of the vehicle body embodying one form of the invention;

Fig. 6 is a vertical sectional view taken on the line VI—VI of Fig. 5;

Fig. 7 is a vertical sectional view taken on the line VII—VII of Fig. 5; and

Fig. 8 is an enlarged vertical sectional view illustrating one method of assembling the roof and side and end walls of a refrigerating body.

Referring now to Figs. 1 and 2, the body consists of a top 10, side and end walls 11, and floor 12.

The roof 10, according to the invention, is assembled as a unit and consists essentially of an inner sheet or conductor plate 13 and an outer sheet 14 defining a space in which insulating material 15 is carried. The inner sheet or conductor plate 13 is secured at its edges to extruded sections 16. The outer sheet 14 is secured at its edges to roof side and end plates 18, and these in turn are secured to extruded sections 17. Filler strips 19 of wood or other insulating material are secured between the extruded sections 16 and 17 which serve as inner and outer roof rails, respectively.

As best shown in Figs. 3 and 8, each extruded section or inner roof rail member 16 has a horizontal web 20, a relatively long depending flange 21, and a relatively short depending flange 22. The flange 21 has, a short distance from its lower edge, a thickened portion and a rabbet or seating surface 23. This surface may be vertical but preferably inclines slightly from the vertical.

Each extruded section 17 has a horizontal web 24, a relatively long depending flange 25, a relatively short depending flange 26, an upstanding lip 27, and an upstanding leg 28. The depending flange 25 extends downwardly and inwardly to a point a short distance from its lower edge, where a seating surface, which may be vertical but preferably is inclined slightly from the vertical, is provided.

The roof 10 carries containers for a suitable refrigerant, such as dry ice. In the form shown in Figs. 1 and 2, these containers are merely rectangular areas 29 where the outer sheet 14 and insulating material 15 are discontinued so that the dry ice may be placed directly on the conductor plate 13. These areas are framed by inner and outer metal members 30 and 30a and wooden or other non-conducting strips 19a which are secured between the metal member 30 and 30a. The areas for the dry ice are provided with covers 31 formed of metal and having insulating material 15 therein.

In Figs. 3 and 4 I have shown my preferred arrangement of ice containers. In this form each compartment of the body is provided with a container in the roof, there being insulating material 15 between the container and the outer roof sheet 14. The container is accessible through an opening 29a in the inner roof sheet or conductor plate 13. This opening is closed by a trap door 31a forming, when closed, a part of the conductor plate. In this form, the ice is placed in the containers from the inside of the truck so that the roof may be made less substantial and consequently lighter in weight.

Each side and end wall 11 consists essentially of an inner sheet 33 and an outer sheet 34 defining a space for insulating material 35. The upper edges of inner side and end wall sheets are secured to extruded sections 36, while the outer sheets of side and end walls are secured to extruded sections 37. Filler strips 39 of wood or other insulating material are secured between the extruded sections 36 and 37, which serve as inner and outer top rails, respectively. Stiffeners 59 are provided at intervals along the inner and outer walls and may be of any desired construction. Interior partitions or bulk heads 33a divide the load space into compartments, each provided with an icing unit as described above. Stiffeners 59a are provided for the bulk heads 33a.

If it is desired to increase the efficiency of the truck body for hauling less-than-full loads, and if the cost is not objectionable, the compartments may be completely separated by discontinuing the inner roof sheet or conductor plate 13 and the loading floor 63 at the bulkheads 33a or by providing insulation at these points to lessen conduction of heat from unrefrigerated to refrigerated compartments.

The extruded sections 36 and 37 are identical, but since they are reversed in use, and since they correspond to different parts of the structure, they will be described separately. As best shown in Fig. 8, each extruded section or inner top rail member 36 has a horizontal web 40, and a short depending flange 41 having a surface corresponding to the seating surface 23 of the flange 21 of section 16. Each member 36 also has a short upstanding flange 42 and a relatively long depending leg 43. Each extruded section or outer top rail member 37 has the horizontal web 44, a short depending flange 45, a short upstanding flange 46, and a relatively long depending leg 47.

As best shown in Figs. 6 and 7, the lower edges of inner side and end wall sheets are secured to extruded sections 50 which serve as the inner bottom rail. Each extruded section or inner bottom rail member 50 has a vertical web 51, a horizontal leg 52, and a horizontal flange 53. Along its lower outer edge the inner bottom rail member 50 has an inclined plane surface 54. The lower edges of outer side and end wall sheets are secured to extruded sections 55, which serve as the outer bottom rail. Each extruded section or outer bottom rail member 55 has a vertical web 56 and a horizontal leg 57, the vertical web being of uniform thickness save at its upper edge, where a rabbet provides a seating surface 58.

The floor 12 consists of a loading floor 63, a subfloor 64, and a corrugated stiffener sheet 65. Inner bolsters 69 are provided between the subfloor and the corrugated stiffener sheet, and outer bolsters 69a are provided below the subfloor. Channels are used as the bolsters 69 and 69a.

Cradle members, here shown as castings 70 and 71, have webs 72, and each casting has a horizontal surface 73 and an inclined plane surface 74. The length of the webs 72 is determined by the thickness of the walls desired. The inclined plane surfaces 74 of the castings 70 and 71 correspond to the inclined plane surface 54 of the inner bottom rail member 50. Attaching flanges 75 are provided on the castings 70 and 71.

The cradle members, if of metal, preferably are insulated from the outer shell or the inner shell, but may be made completely of non-conducting material, in order to increase the refrigerating efficiency of the truck body.

Any suitable side door construction may be used, so long as it does not require any change in the construction of top and bottom rails.

The inner side and end walls and the loading floor are assembled as a unit. The inner bolsters 69 are placed on the horizontal flanges 53 of inner bottom rail members 50 and secured to the vertical webs 51 by means of angles, as shown. The corrugated stiffener sheet 65 is then placed on the bolsters 69, and the loading floor is secured to the horizontal legs 52 of inner bottom rail members 50. The inner side and end wall sheets 33, with the stiffeners 59 already attached, are secured along their lower edges to the upper edges of the vertical webs 51 of the inner bottom rail members 50. The inner top rail is now placed by securing the depending legs 43 of members 36 to the inner wall sheets 33. The bulkheads 33a may be placed before or after the inner top rail is secured. The assembly of the side and end walls and floor of the inner shell is completed by securing the corners with angles 80.

The outer side and end walls and subfloor are also assembled as a unit. The outer bolsters 69a are secured to the vertical webs 56 of outer bottom rail members 55 below the horizontal legs 57, and the subfloor 64 is secured to these horizontal legs 57. The members 70 are anchored in the corners of the outer bottom rail 55 by securing the attaching flanges 75 to the vertical webs 56 above the horizontal legs 57. The members 71 are similarly secured at locations corresponding to those of inner shell bulk heads. The outer side and end wall sheets 34 are now secured to the outer bottom rail members 55 by attaching the lower edges of the sheets to the bottom rail members at the seating surfaces 58 of vertical webs 56. The outer top rail members 37 are secured by attaching depending legs 47 to the upper edges of outer side and end wall sheets 34. The insulating material 35 is then anchored to the outer top rail members 37, and the assembly of the side and end walls and floor of the outer shell is completed by securing the angles 81.

It will be understood that the roof is also assembled as a unit and has the form shown in Fig. 3, except that it may have the type of ice container shown in Figs. 1 and 2. As best shown in Fig. 8, the extruded sections 16 are secured to the inner sheet or conductor plate 13 by attaching at the horizontal web 20, and the extruded sections 17 are secured to the roof side and end plates 18 by attaching the upstanding legs 28. Any method of assembling the roof may be followed, but it is to be understood that the last step in assembling the roof will be the step of securing together flanges 22 and 26 and strips 19. Before the roof is secured to the walls, insulating material 15 is placed between the depending flanges 21 and 25 and is loosely held in place by the inwardly extending portion of the flange 25 and the thickened portion of the flange 21.

In assembling the body, the inner wall and floor assembly is lowered into the outer wall and floor assembly to which the insulating material is anchored as previously described. The horizontal flange 53 of each inner bottom rail member then rests on the horizontal surfaces 73 of the castings 70 and 71, and the inclined plane surface 54 of each inner bottom rail member rests on the inclined plane surfaces 74 of the castings, so that the inner wall and floor assembly is cradled in position in the outer wall and floor assembly.

Inner and outer wall and floor assemblies are then secured together by placing the strips 39 between the flanges 42 and 46 of extruded sections 36 and 37 and riveting or otherwise securing them together.

The roof is now lowered into position, the seating surfaces at the lower edges of depending flanges 21 and 25 of the roof rail members bearing on the surfaces of depending flanges 41 and 45 of the top rail members. It will be obvious that these meeting surfaces may be, and preferably are, suitably inclined from the vertical, as this simplifies fitting the roof in position. The entire assembly is completed by riveting or otherwise securing together the depending flanges 21 and 41 of the inner roof and top rail members 16 and 36 and the depending flanges 25 and 45 of the outer roof and top rail members 17 and 37.

It will be seen that the construction of my invention provides a simple and economical method of assembling a light and strong refrigerating vehicle body. Each securing point is accessible from both sides, so that the parts may be fastened rigidly together.

While I have described my invention as applied to an automobile truck body designed particularly for carrying ice cream, it is to be understood that the principles thereof are applicable to any type of refrigerating vehicle body. It is also to be understood that the invention is not limited with regard to methods of securing the parts of the body or with regard to the method of manufacture of the various parts. Any continuous metal members may be used instead of the extruded sections described, and the parts shown as castings may be forgings or built-up pieces, or may be of some non-conducting material.

I claim:

1. In a refrigerating vehicle body having inner and outer shells comprising inner and outer wall and roof elements, wall and roof securing means comprising a member secured to each edge of the inner roof element, a member secured to each edge of the outer roof element, a member secured to the top of each inner wall element, and a member secured to the top of each outer wall element, all of said members having complementary attaching flanges for securing together adjacent members.

2. In a refrigerating vehicle body having inner and outer shells comprising inner and outer wall and roof elements, wall and roof securing means comprising a continuous member secured to each edge of the inner roof element, a continuous member secured to each edge of the outer roof element, a continuous member secured to the top of each inner wall element, and a continuous member secured to the top of each outer wall element, all of said continuous members having complementary attaching flanges for securing together adjacent continuous members.

3. In a refrigerating vehicle body having an inner shell and an outer shell, members having inclined plane surfaces at the bottom of the inner shell and members attached to the bottom of the outer shell and having inclined plane surfaces complementary to the inclined plane surfaces on the first-named members and adapted to cooperate therewith to center the said inner shell with respect to said outer shell.

4. In a refrigerating vehicle body having an inner shell and an outer shell, continuous members having inclined plane surfaces at the bottom of the inner shell and members attached at intervals at the bottom of the outer shell and having inclined plane surfaces complementary to the inclined plane surfaces on the continuous members and adapted to cooperate therewith to center the said inner shell with respect to said outer shell.

5. In a refrigerating vehicle body having an inner shell and an outer shell comprising inner and outer wall and roof elements, wall and roof securing means comprising a member secured to each edge of the inner roof element, a member secured to each edge of the outer roof element, a member secured to the top of each inner wall element, and a member secured to the top of each outer wall element, all of said members having complementary attaching flanges for securing together adjacent members, and centering means comprising members having inclined plane surfaces at the bottom of the inner shell and members attached at the bottom of the outer shell and having inclined plane surfaces complementary to the inclined plane surfaces on the members at the bottom of the inner shell and adapted to cooperate therewith.

6. In a refrigerating vehicle body comprising an inner shell and an outer shell and formed of composite walls, composite roof and composite floor, means for securing the roof to the walls comprising a pair of members extending along the upper edge of each composite wall, a pair of members extending along each edge of the composite roof, and complementary attaching flanges on said wall members and said roof members.

7. In a refrigerating vehicle body comprising an inner shell and an outer shell and formed of composite walls, composite roof and composite floor, means for securing the roof to the walls comprising a pair of members extending along the upper edge of each composite wall, a pair of members extending along each edge of the composite roof, and complementary attaching flanges on said wall members and said roof members, and centering means for the inner shell comprising a member having an inclined plane surface extending continuously along the lower edge of each inner side wall and members secured to the lower edges of outer walls and having inclined plane surfaces complementary to the inclined plane surfaces on the continuous members and adapted to cooperate therewith.

8. In a refrigerating vehicle body comprising an inner shell and an outer shell, securing means for securing together the inner and outer shells, and centering means comprising a member having an inclined plane surface and extending along the bottom of each inner wall and members attached at intervals to the outer shell and having inclined plane surfaces complementary to the inclined plane surfaces on said first-named members and adapted to cooperate therewith.

9. In a refrigerating vehicle body comprising inner walls and outer walls, means for securing together the inner and outer walls, and centering means comprising a member extending along the bottom of each inner wall and members attached at intervals to the outer walls, said members having surfaces complementary to each other.

MILO M. DEAN.

CERTIFICATE OF CORRECTION.

Patent No. 2,050,425. August 11, 1936

MILO M. DEAN.

It is hereby certified that error appears in the printed specification of the above numbered patent requiring correction as follows: Page 3, first column, after the numeral and period "37." in line 43 insert the following paragraph:

> In reference to Fig. 8, it will be understood that suitable insulating material 15 occupies the roof space and the space defined by the inner and outer top and roof rails, as shown in Figs. 1 and 2, this material having been omitted in Fig. 8 for the purpose of clarifying the construction incorporated in this part of the refrigerating body structure;

and that the said Letters Patent should be read with this correction therein that the same may conform to the record of the case in the Patent Office.

Signed and sealed this 22nd day of September, A. D. 1936.

Henry Van Arsdale (Seal)  Acting Commissioner of Patents.